March 26, 1940.   E. M. CADWALLADER   2,194,466
MINING APPARATUS
Original Filed Aug. 13, 1937   13 Sheets-Sheet 1
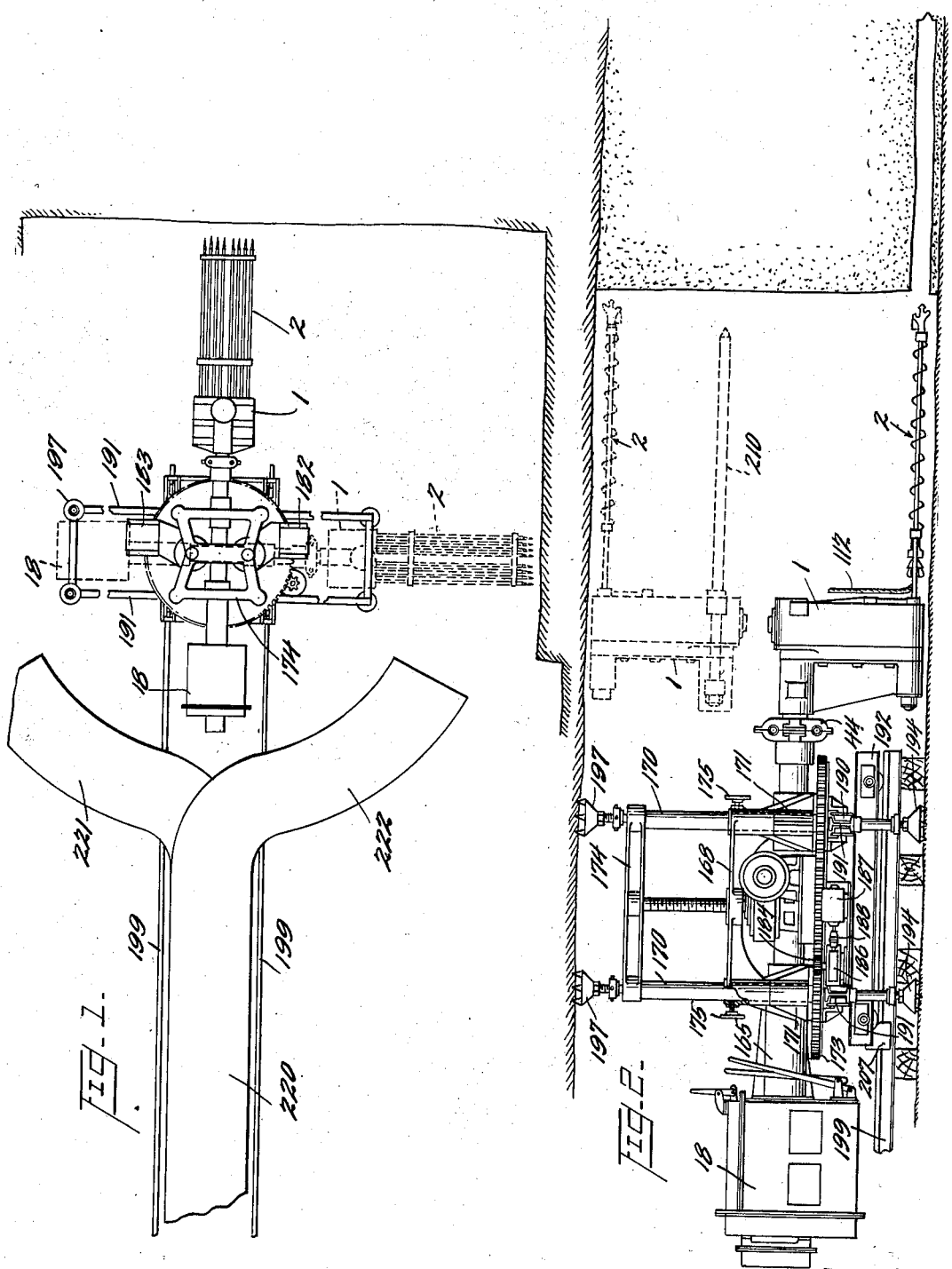
Inventor
By Edgar M. Cadwallader,
Wray N. Hofman Attorney March 26, 1940. E. M. CADWALLADER 2,194,466
MINING APPARATUS
Original Filed Aug. 13, 1937 13 Sheets-Sheet 2
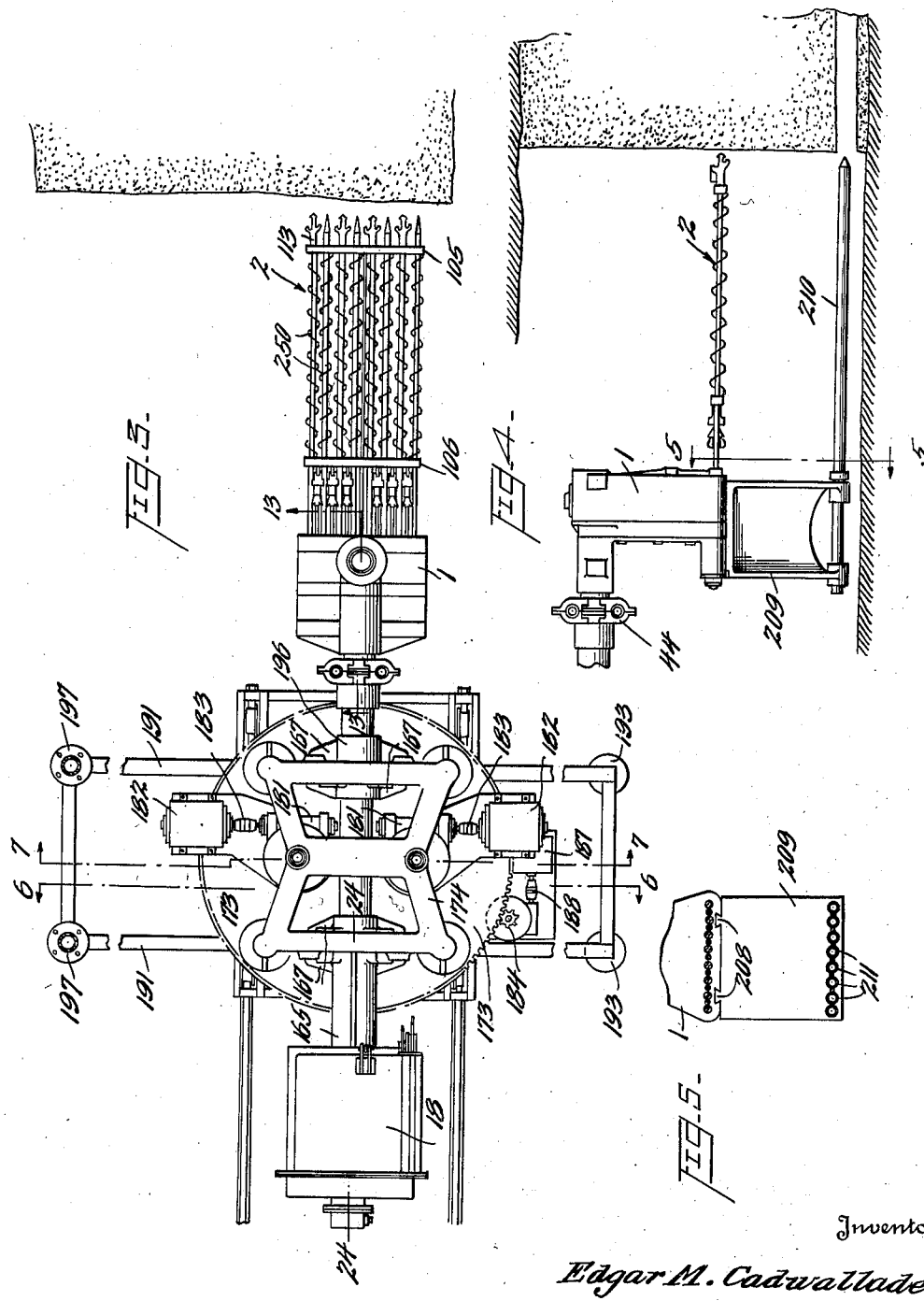
Inventor
Edgar M. Cadwallader,
By Wray N. Hoffman
Attorney

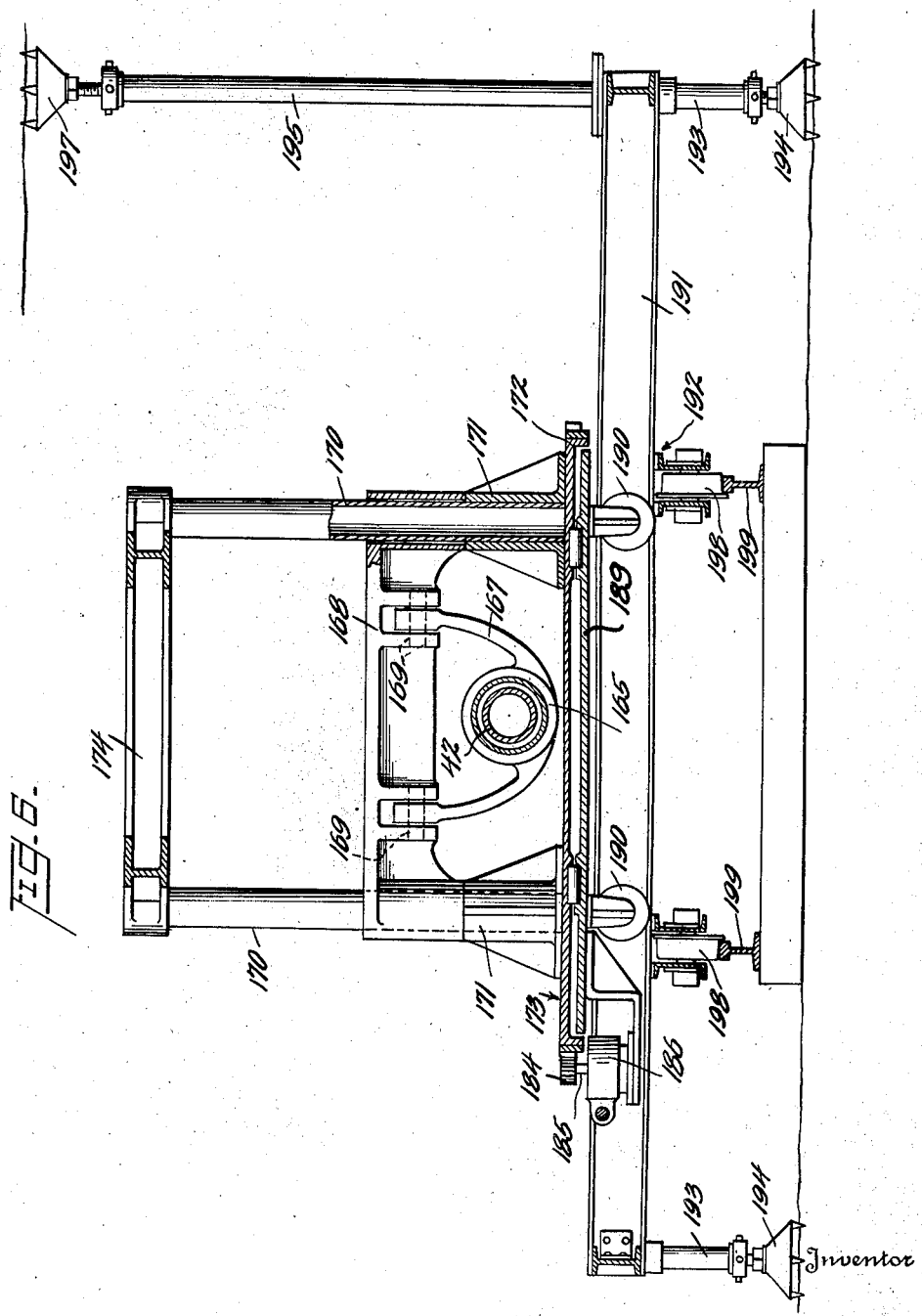

March 26, 1940.  E. M. CADWALLADER  2,194,466
MINING APPARATUS
Original Filed Aug. 13, 1937    13 Sheets—Sheet 4
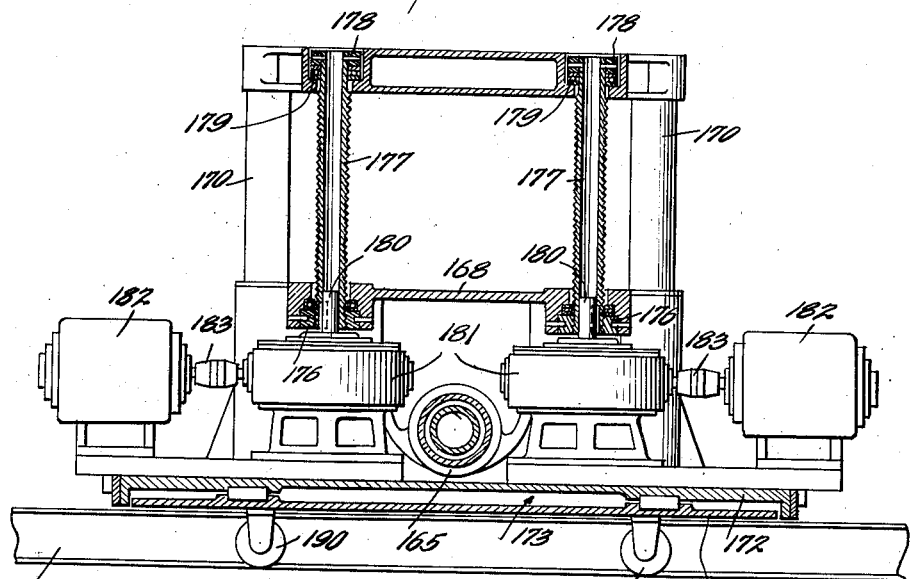
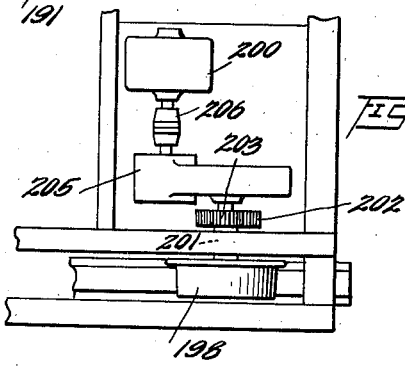
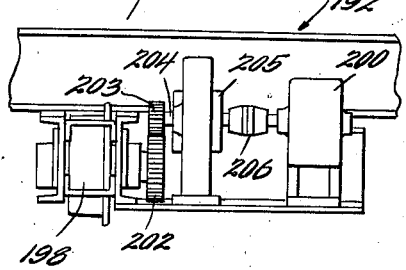
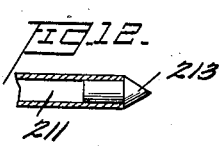
Inventor
Edgar M. Cadwallader,
By Wray N. Hoffman
Attorney

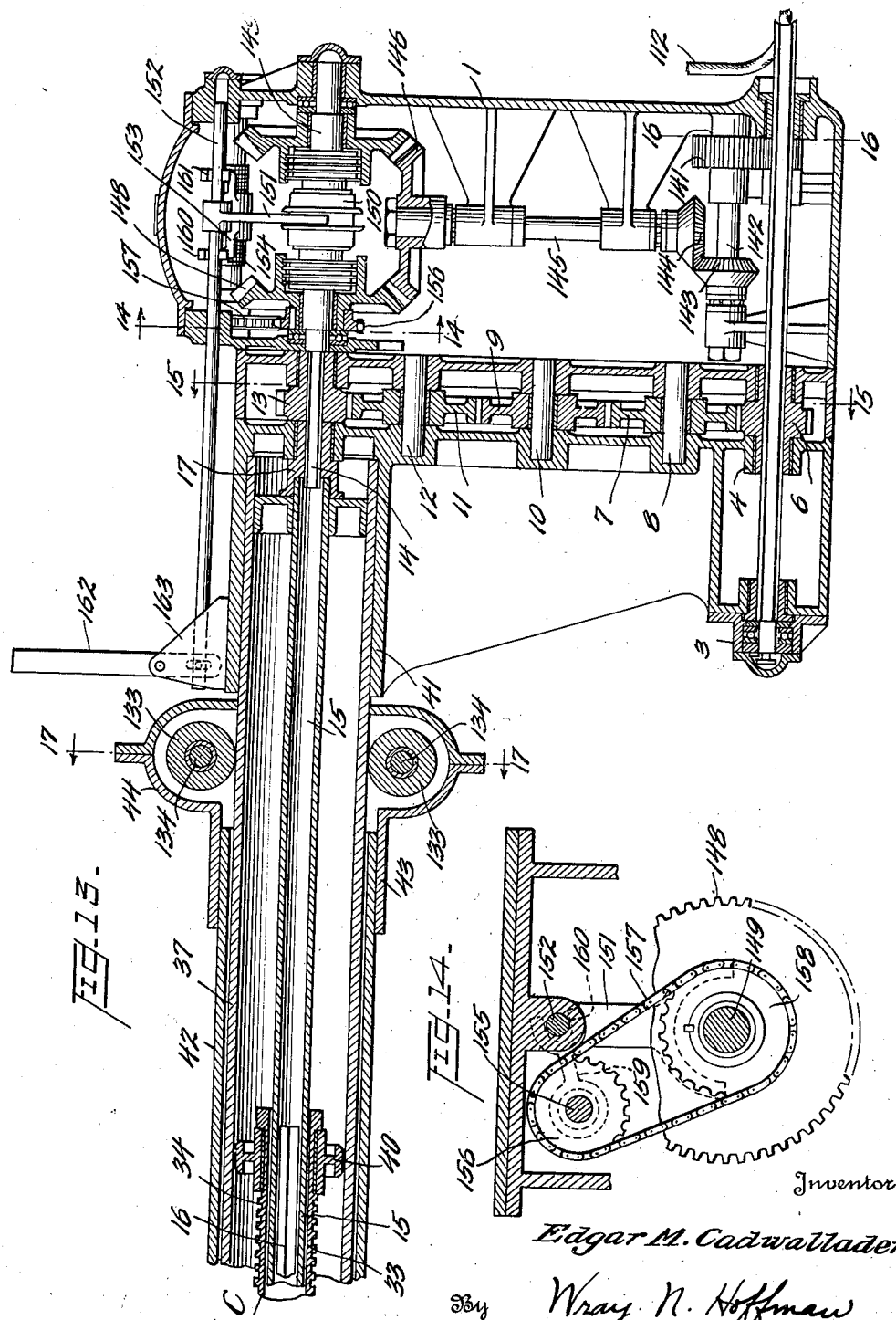

March 26, 1940.   E. M. CADWALLADER   2,194,466
MINING APPARATUS
Original Filed Aug. 13, 1937   13 Sheets-Sheet 6
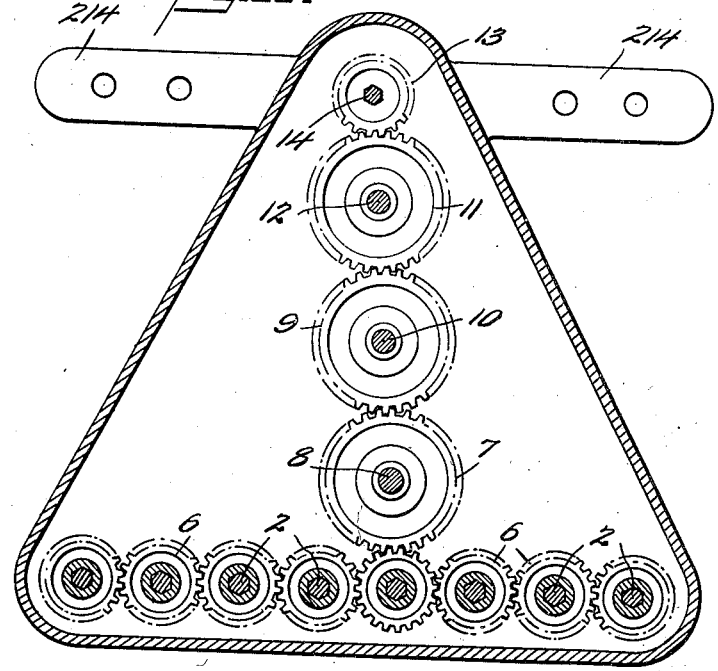
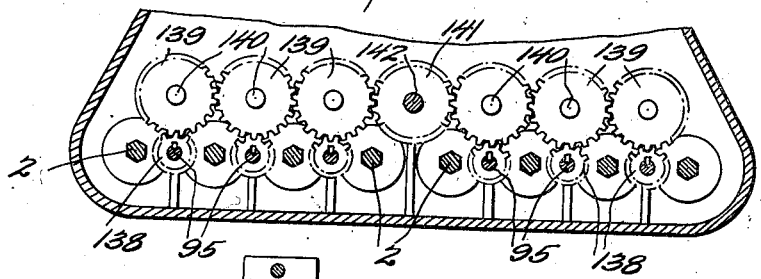
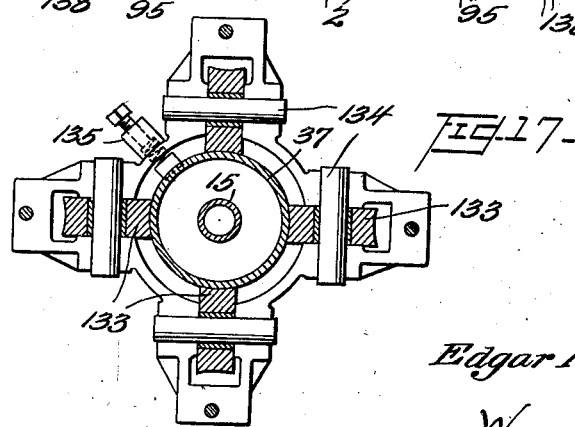
Inventor
Edgar M. Cadwallader,
By Wray N. Hoffman
Attorney

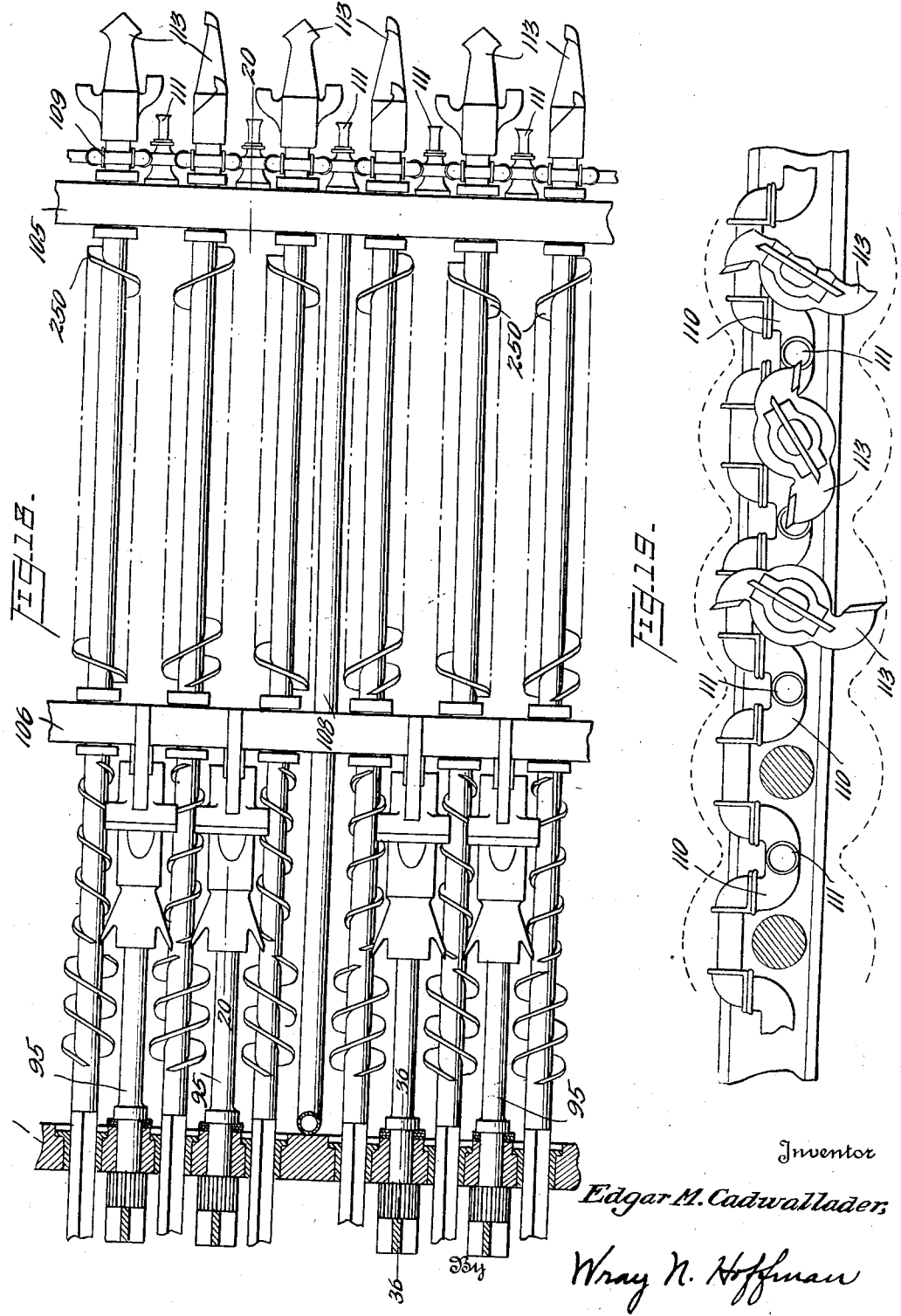

March 26, 1940.  E. M. CADWALLADER  2,194,466
MINING APPARATUS
Original Filed Aug. 13, 1937   13 Sheets-Sheet 8
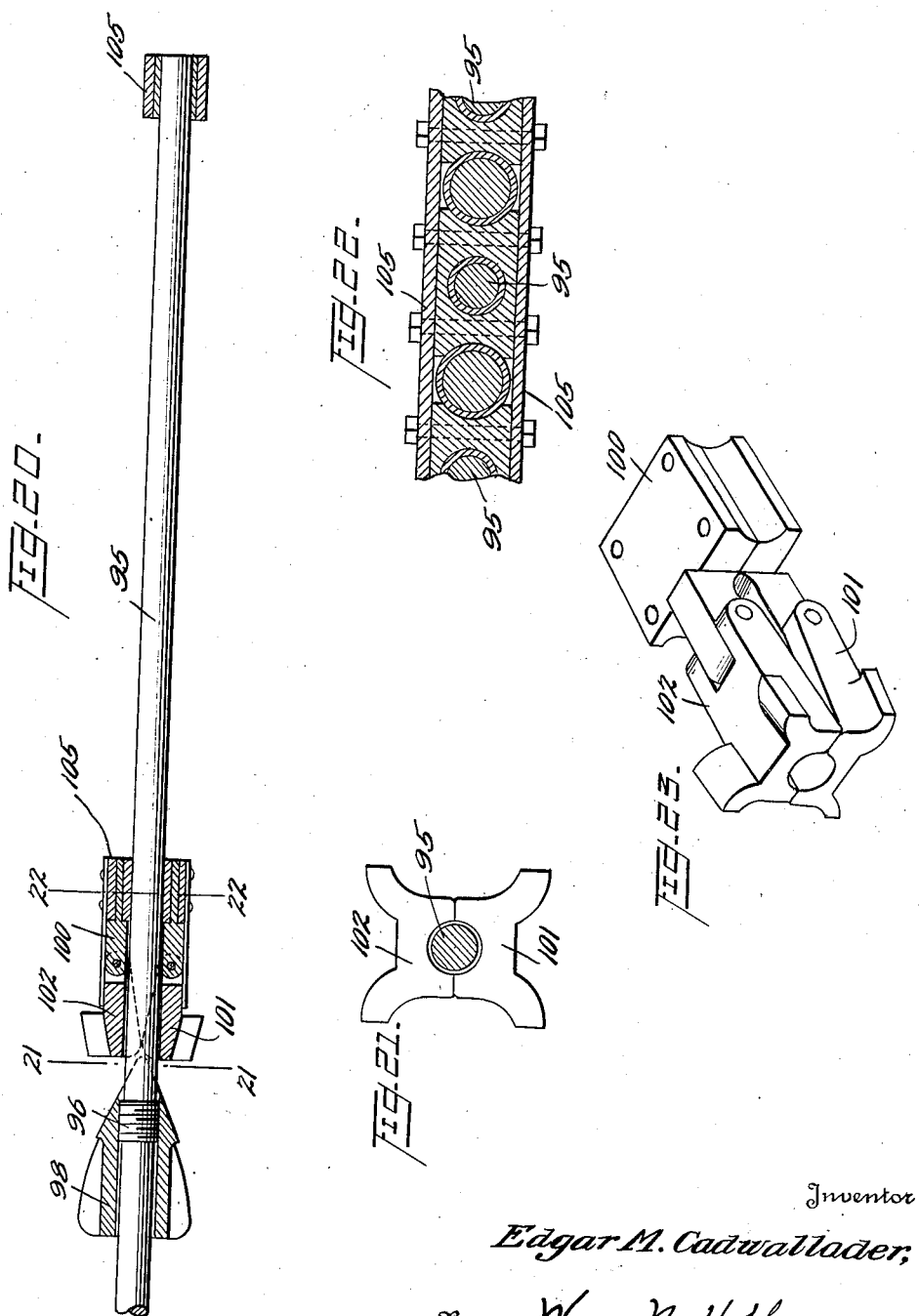
Inventor
Edgar M. Cadwallader,
By Wray N. Hoffman
Attorney

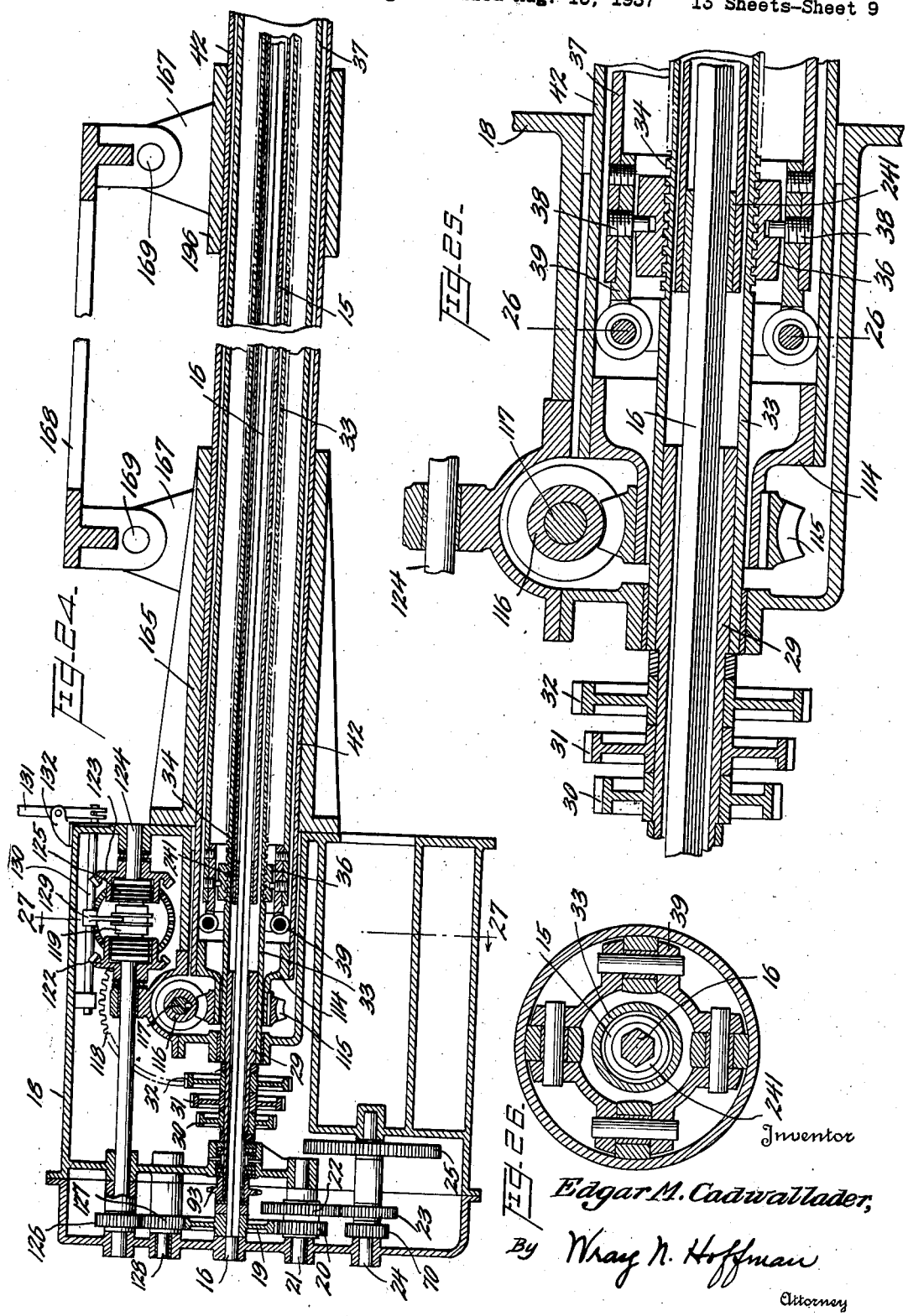

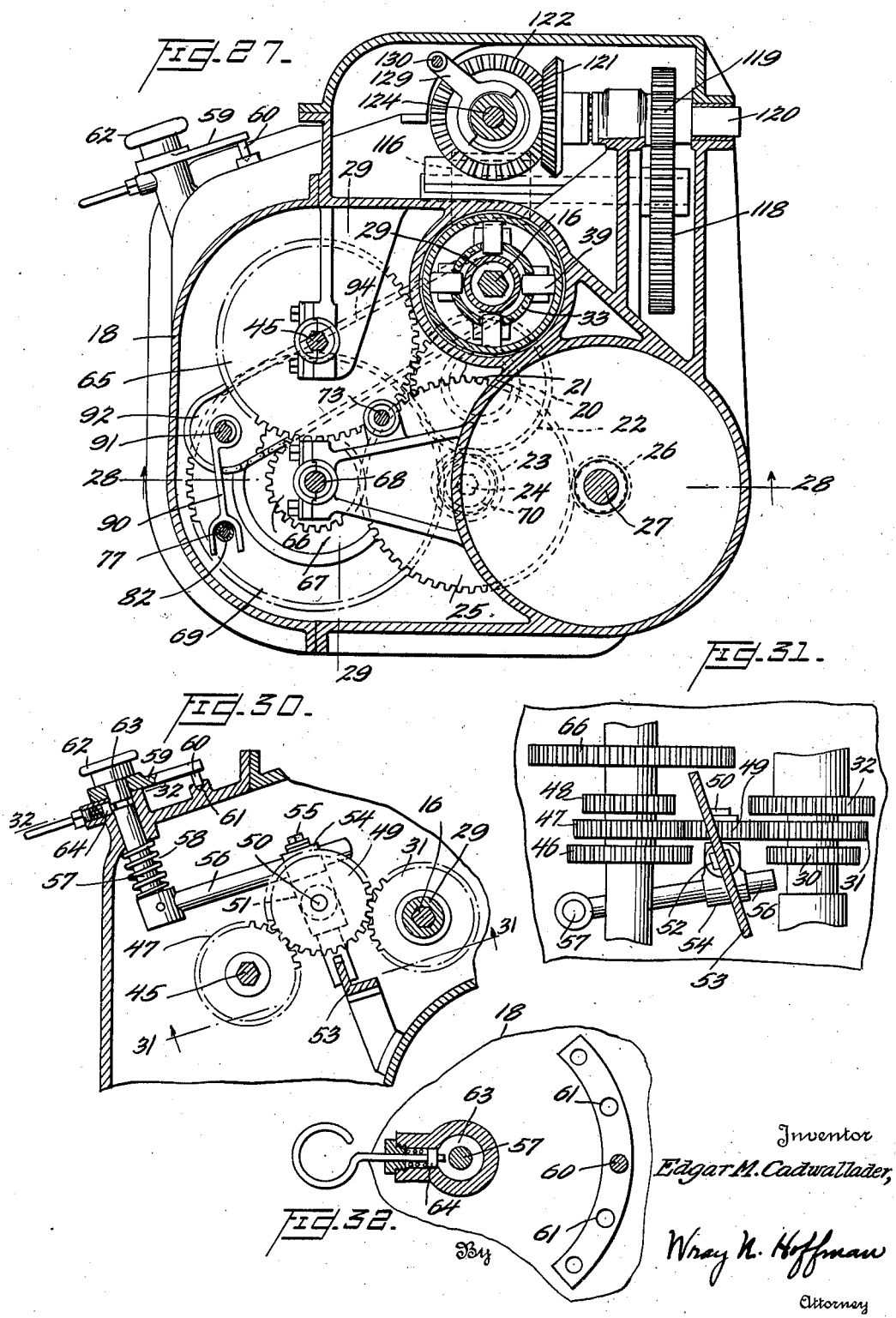

March 26, 1940.  E. M. CADWALLADER  2,194,466
MINING APPARATUS
Original Filed Aug. 13, 1937   13 Sheets-Sheet 11
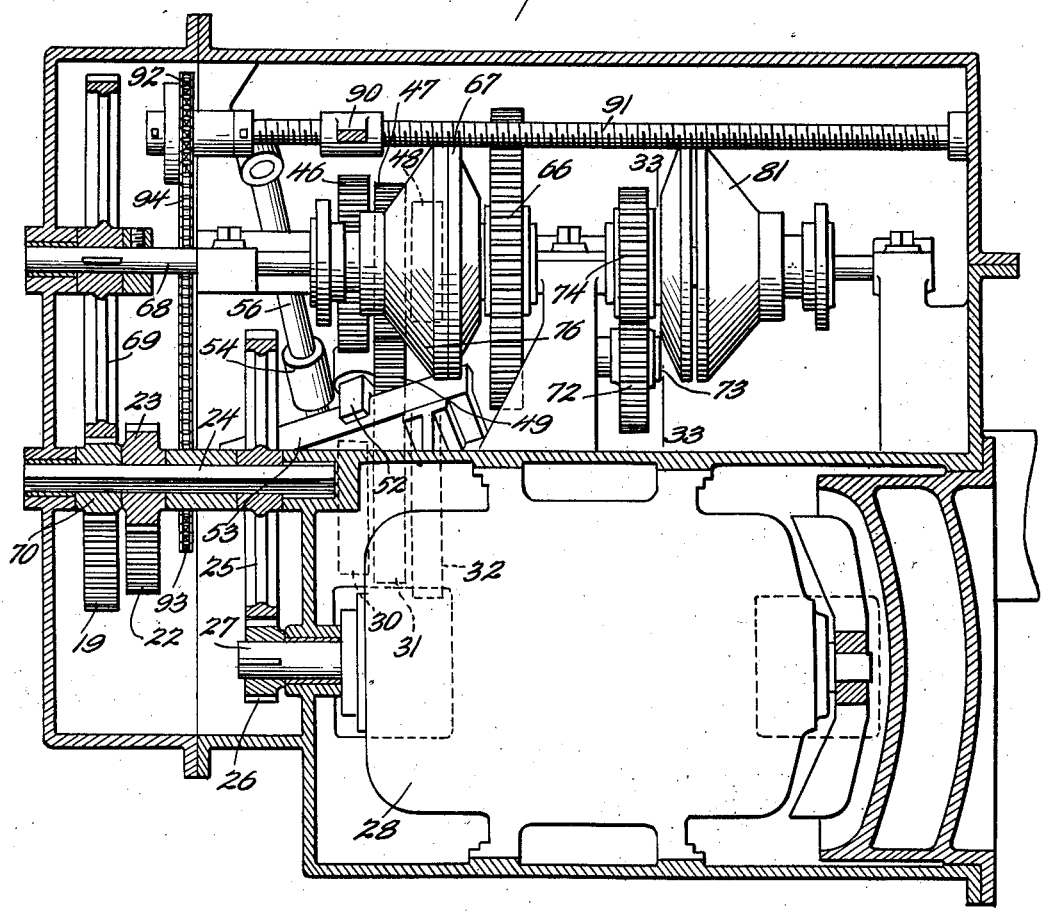
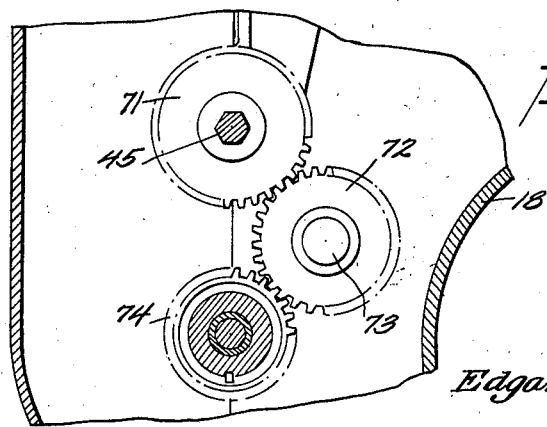
Inventor
Edgar M. Cadwallader,
By Wray N. Hoffman
Attorney March 26, 1940.  E. M. CADWALLADER  2,194,466
MINING APPARATUS
Original Filed Aug. 13, 1937  13 Sheets-Sheet 12
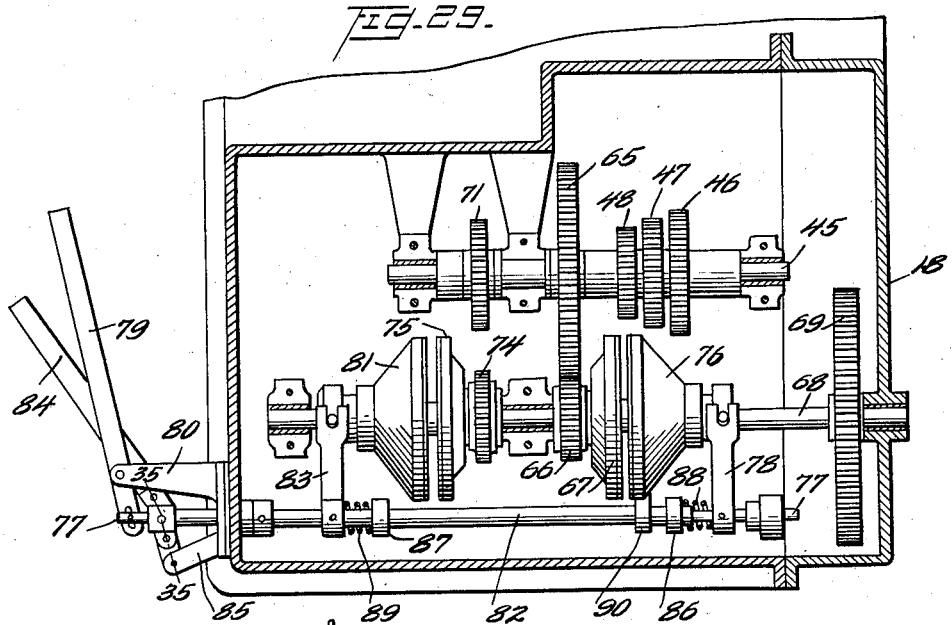
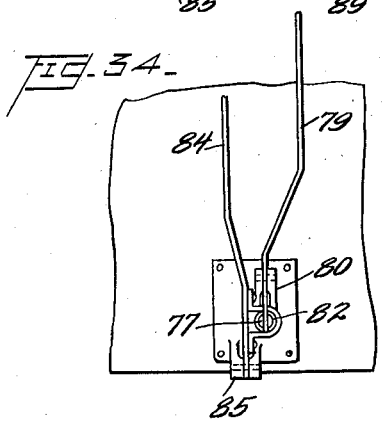
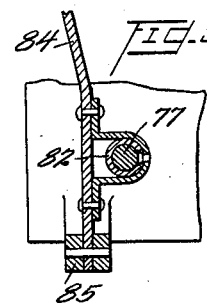
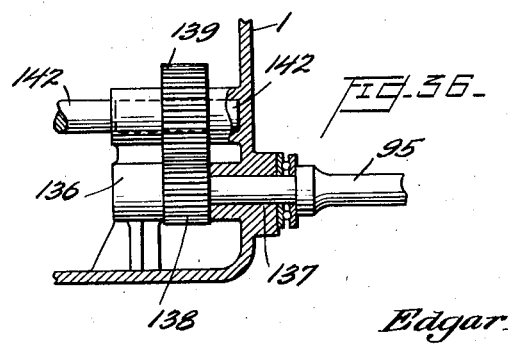
Inventor
*Edgar M. Cadwallader,*
By *Wray N. Hoffman*
Attorney March 26, 1940.   E. M. CADWALLADER   2,194,466
MINING APPARATUS
Original Filed Aug. 13, 1937   13 Sheets-Sheet 13
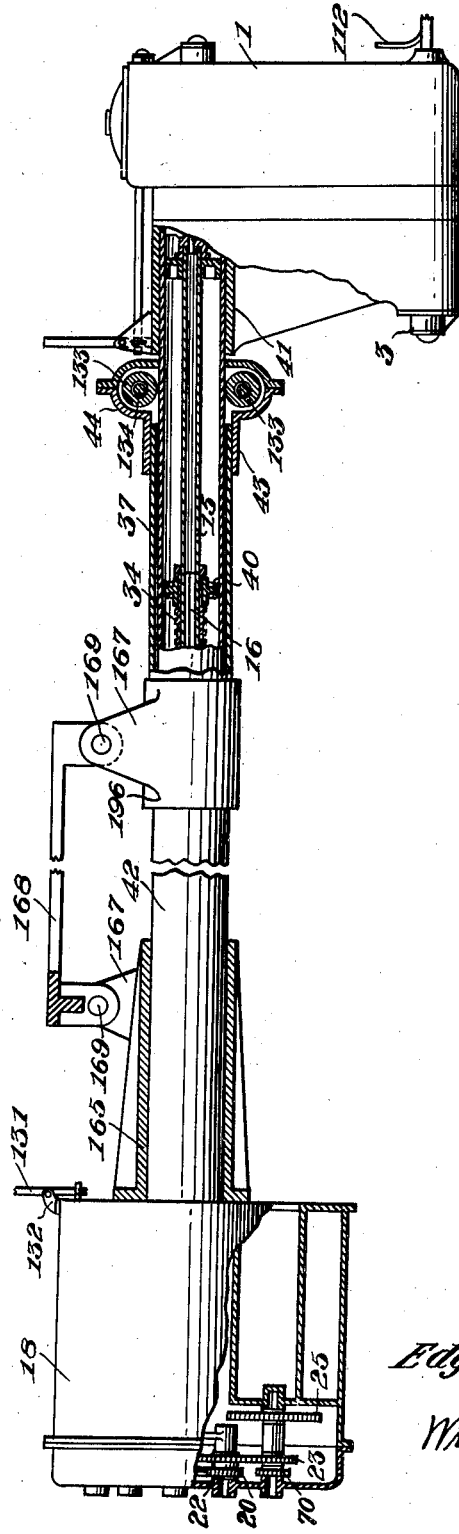
Inventor
Edgar M. Cadwallader
Wray N. Hoffman
Attorney

Patented Mar. 26, 1940

2,194,466

UNITED STATES PATENT OFFICE 2,194,466

MINING APPARATUS

Edgar M. Cadwallader, Cleveland, Ohio, assignor to Mineral Cutting Machine Company, Inc., Cleveland, Ohio, a corporation of Delaware Application August 13, 1937, Serial No. 159,021
Renewed June 15, 1939

29 Claims. (Cl. 262—22)

This invention relates to an apparatus for mining coal or similar mineral. More particularly it has to do with the mining of coal or similar mineral which is found in strata or veins of such nature as to permit it to be mined by the well known conventional systems of mining, for example, entry, long-wall, short-wall, room systems of mining. In all of such systems the floor and roof of the portion of the veins or strata from which the coal or mineral is to be mined are substantially horizontal or flat. Thus, the mining of coal or similar mineral from strata or veins having a floor which is substantially horizontal or flat may be termed "flat mining", and hence will be so termed in the description hereinafter set forth.

Flat mining, as commonly practiced, consists in the formation of an undercut at the juncture point of the breast and the floor of the vein to sever or fracture the cleavage between the bed rock of the floor and the coal or mineral to be mined by means of an undercutter chain or like means, drilling holes into the face of the breast at suitably spaced points, filling each hole with a charge of explosive, and then setting off such charges. Thus, the coal or mineral is broken away from the face or breast by blasting. In this method the degree of impact and shattering power of the blast is dependent upon the skill of the miner in selecting the proper relative positions of each hole, in drilling the holes to the proper depth, in employing the correct amount of the explosive charge, and in tamping the charge properly in each of the holes. If great care and skill are not exercised by the miner, a blasting effect will result which is of such intensity and repercussion as to cause severe fractures in the lateral ribs and cave-ins in the roof and shatter the coal or mineral into a relatively high percentage of small particles of a size known as undersized coal or fines.

In the flat mining of coal or mineral employing explosives, the formation of the undercut causes considerable coal dust which, together with the undue amount of smoke and coal dust resulting from the blasting, are not only injurious to the health of the workmen, but also unduly tax the system of ventilation. In addition, there is the grave danger of gas explosions and consequent fires which result in many injuries or fatalities to the workmen. Moreover, as it is not possible to dislodge the coal or mineral from the entire area of the breast or face by blasting without causing some damage to the roof and the lateral ribs, it is necessary to continually reinforce the roof by means of upright timbers and collars so as to protect the workmen from injury or fatality due to the falling of pieces or sections of the roof. The bringing of the timber required for this purpose to the working breast is an extremely difficult and burdensome task for the workmen because of its great weight.

Accordingly, an object of the present invention is to provide an apparatus for flat mining wherein the coal or similar mineral is mined without blasting.

Another object of the present invention is to provide an apparatus for flat mining which enables the coal or similar mineral to be mined without the use of any explosives, and thereby eliminate the dust and explosion hazards.

Another object of the present invention is to provide an apparatus for flat mining whereby the coal or similar mineral is mined in an expeditious and commercially feasible manner without the use of explosives.

A further object of the present invention is to provide an apparatus for the mining of coal or similar mineral which is capable of performing all of the operations incident to the flat mining of coal or mineral without the use of explosives.

A still further object of the present invention is to provide an apparatus for the mining of coal or similar mineral which is universally adjustable with respect to the face or breast of the vein, and simple to operate.

Other objects and advantages will be apparent as the invention is described in greater detail in connection with the accompanying drawings wherein:

Figure 1 is a plan view showing the apparatus according to the present invention in operative position in a coal or mineral vein of the flat floor type.

Figure 2 is a side elevation of the coal or mineral mining apparatus.

Figure 3 is a plan view of the apparatus shown in Figure 2.

Figure 4 is a side elevation showing a bracket secured to the lower portion of the boring element assembly housing for carrying an apron.

Figure 5 is a sectional view taken on the line 5—5 of Figure 4.

Figure 6 is a cross-sectional view taken on the line 6—6 of Figure 3.

Figure 7 is a sectional view taken on the line 7—7 of Figure 3.

Figure 8 is a plan view of one corner of the truck carriage showing the mechanism for driving the same.

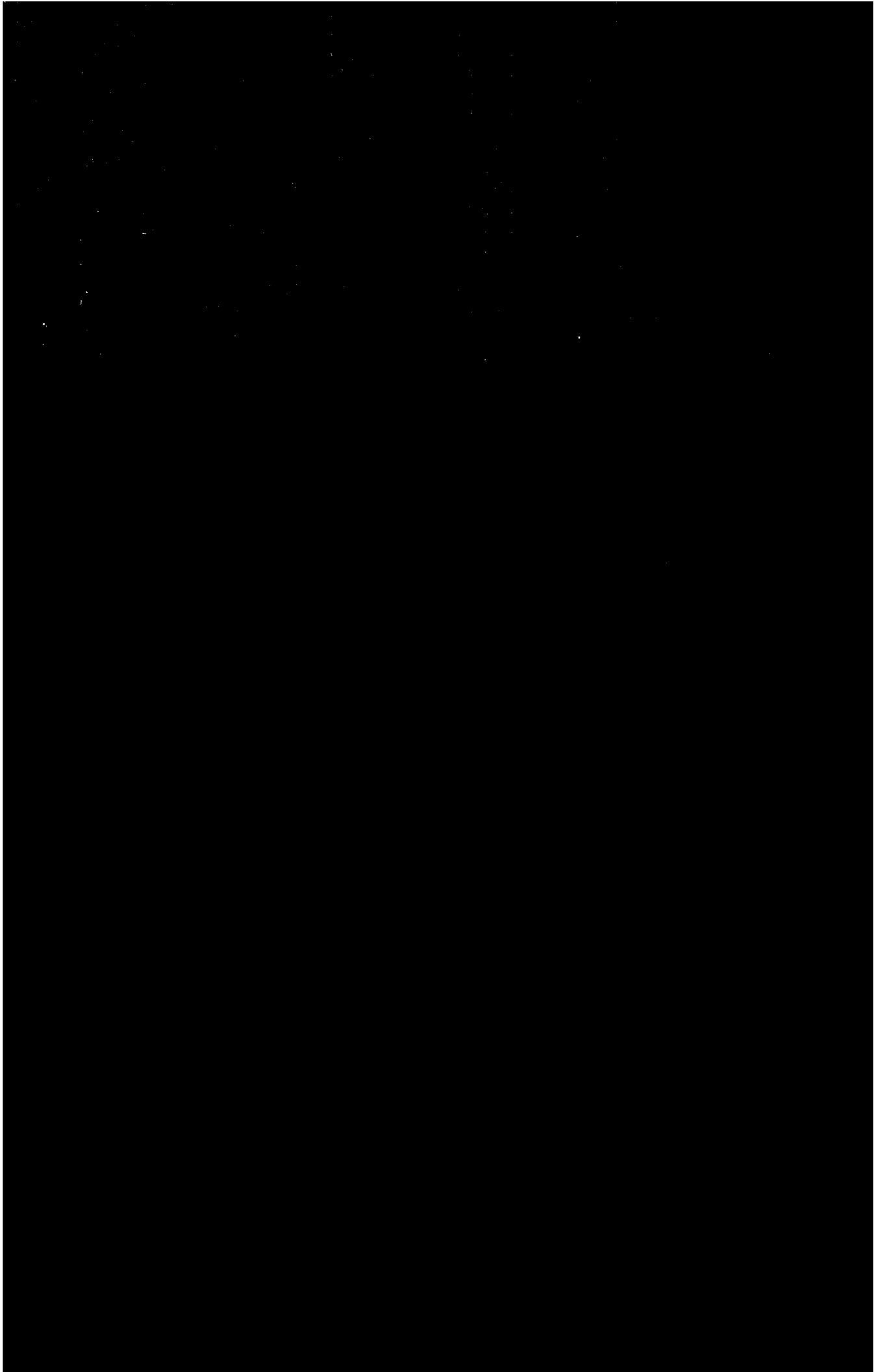

By reference to Figures 13 and 24 it will be seen that surrounding the portion of the hexagonal shaft 16 which is within the transmission casing 18 is a sleeve 29. Mounted in surrounding relation with the sleeve 29 is a hollow tube 33 which has a threaded portion 34. Into the free end of the tube 33 telescopes the free end of the hollow tube 15.

As clearly shown in Figures 25 and 26 in threaded engagement with the threaded portion 34 is a traveling nut 36 which is fixedly secured to the inner peripheral surface of a hollow tube 37 by means of pins 38. Carried by the pins 38 is a roller assembly 39. On the threaded portion 34 at a point suitably spaced from the nut 36 is a collar 40 Figure 13 which acts to maintain such threaded portion in aligned position within the tube 37. The end of the tube 37 opposite the travelling nut 36 extends into the projection 41 of the housing 1 and is fixedly secured thereto.

As shown in Figure 24 on the sleeve 29 is keyed a nest of gears 30, 31, and 32 which are of varying diameters. Carried by a shaft 45 Figures 27, 30, and 31 is a nest of gears 46, 47, and 48 which are likewise of varying diameters. This last-named nest of gears is in alignment with but in reverse complemental relation with the nest of gears 30, 31, and 32. A gear 49 carried by a loose shaft 50 is shiftable to a position such that it will mesh with any pair of opposed gears of the respective nest of gears previously described. For example, it may be made to mesh with gears 31 and 47, as clearly shown in Figures 30 and 31. The mechanism for shifting the loose shaft 50 to the meshing position desired for the gear 49 with the opposed pair of nest of gears comprises as shown in Figures 28, 30, and 31 a bearing 51 provided with a forked extension 52 carried by the shaft 50 which forked extension engages with and rides along an angularly disposed track 53. The bearing pin 51 has a loose collar 54 which is secured thereto by means of a pin 55. Extending through the collar 54 is a slidable arm 56 which is secured to one end of a pin 57 mounted in the lower portion of the transmission casing 18, and surrounding the pin 57 and bearing against the arm 56 and the inside surface of the transmission casing 18 is a spring 58. To the opposite end of the pin 57 Figure 30 is secured an arm 59 which has its free end locked to the transmission casing 18 by means of a pin 60 being inserted in any one of the holes 61 Figure 32 in the transmission casing. The holes 61 are spaced in such manner as to correspond with the meshing position of gear 49 with any one of the opposed pairs of the respective nests of gears. On the top of the pin 57 is securedly fixed a knob 62 for operating the pin and arm 59. The pin 57 is provided with a cut out portion 63 which receives the end of locking pin 64 extending through an opening in the transmission casing 18 as shown in Figure 32.

As shown in Figures 27, 28, and 29 on the shaft 45 carrying the nest of gears 46, 47, and 48, there is also mounted a gear 65 which meshes with a gear 66 attached to and forming a part of the loose part of the forward friction disk clutch 67 loosely mounted on the shaft 68. The shaft 68 also carried a gear 69 which meshes with a pinion 70 carried by the shaft 24. The shaft 24 is connected to the pinion 26 of the motor shaft 27 through the medium of gear 25 as previously described.

Carried by the shaft 45 is also a gear 71 Figure 29 which meshes with an intermediate gear 72 Figures 28 and 33 carried by the stub shaft 73. The gear 72 in turn meshes with a gear 74 Figures 29 and 33 which is attached to and is a part of the loose part of the reverse friction disk clutch 75 loosely mounted on shaft 68. The shaft 68 is connected to the pinion 26 Figure 28 of the motor shaft 27 through the medium of gear 69, pinion 70, and gear 25 on shaft 24.

On shaft 68 Figures 27 and 29 in complemental relation with the loose part 67 of the forward friction disk clutch is fixedly mouned the slidable part 76 of such friction disk clutch which is connected to one end of a rod 77 by the pin and yoke connection 78. To the opposite end of said rod 77 which protrudes out of the transmission casing 18 is secured a hand lever 79 which is pivotally connected to a brace member 80. The hand lever 79 is for the purpose of operating the clutch.

Fixedly mounted upon the shaft 68 Figure 29 is the slidable part 81 of the reverse friction disk clutch in complemental relation with the loose part 75 of such clutch. The slidable part 81 is connected to one end of the hollow tube 82 by means of the pin and yoke connection 83. As shown in Figures 29 and 35, the tube 82 is in surrounding relation with respect to rod 77, and has its opposite free end protruding out of the transmission casing 18 to which is secured a hand lever 84, said lever being pivotally connected to a brace member 85. The hand lever 84 operates the reverse clutch.

As shown in Figure 29, the tube 82 is provided with collars 86 and 87 disposed adjacent the yoke members 78 and 83 respectively. Attached to the collar 86 and bearing against yoke connection 78 is a compression spring 88, and a compression spring 89 having an end attached to the collar 87 which bears against yoke connection 83. Engaging with the tube 82 and movable therealong is a forked member 90 which is secured to the threaded shaft 91 which carries a sprocket 92 on one end thereof. In engagement with the sprocket 92 and extending to and engaging with a sprocket 93 carried by the end of the sleeve 29 is a sprocket chain 94. The forked member 90 is moved forward or backward along the tube 82 by this sprocket mechanism until it bears against either of the collars 86 or 87 depending upon whether the forward or reverse clutch is in operative relation to automatically disengage the respective clutch.

As will be apparent from Figures 3 and 18, the boring elements 2 are suitably spaced from each other and are in aligned relation. Disposed intermediate a pair of the boring elements 2 is an expansive force inducing element. Since the structure of the expansive force inducing elements is the same, the structure of only one will be described. Such element comprises a rod 95 which is provided with enlarged threaded portions 96 and 97 suitably spaced therealong as shown in Figure 20. In threaded engagement with each of the enlarged portions 96 and 97 is a nut 98 having a pointed nose 99. In complemental relation to each pointed nose 99 of the nuts 98 is mounted a squared block 100 such as shown in Figure 20. To each of the blocks 100 are pivotally connected jaw members 101 and 102 which cooperate with a pointed nose 99 of each of the nuts 98. The jaw members 101 and 102 are of the configuration shown in Figures 20, 21, and 22. The blocks 100 carrying the jaw members 101 and 102 are supported in complemental relation with respect to the pointed nose 99 of each of the nuts 98 by means of transverse guide bars 105 and 106.

As shown in Figure 36 the back end of the rod 95 carrying the expansive force inducing elements extends through an opening into the housing 1, and is mounted in bearings 136 and 137. On the rod 95 intermediate the bearings 136 and 137 is fixedly mounted a pinion 138 as likewise shown in Figure 36. As shown in Figure 18, there are a series of such rods 95, each of which carries a pinion 138. Each pinion 138 meshes with a gear 139 carried by a stub shaft 140. As will be apparent from Figure 16, there are six pinions 138, each of which mesh with a gear 139, and intermediate the two central gears 139 and in meshing engagement therewith is a gear 141 carried by a shaft 142. The shaft 142 Figure 13 also carries a bevel gear 143 which meshes with a bevel gear 144 mounted on the shaft 145. Mounted on the shaft 145 is also a bevel gear 146 which meshes with bevel gears 147 and 148 carried by a shaft 149, said shaft 149 being connected to the opposite end of the hexagonal shaft 14. Mounted upon the shaft 149 intermediate the bevel gears 147 and 148 is a forward and reverse clutch 150 which is attached to a shifter yoke 151 fixedly mounted on a shifter bar 152. Cooperating with the shifter yoke 151 is a travelling nut 153 which is carried by a threaded portion 154 of a shaft 155, as shown in Figure 14. The shaft 155 carries a sprocket 156 which is in engagement with a sprocket chain 157, said chain being driven by a sprocket 158 carried by the outer portion of the hub of the bevel gear 148. As shown in Figure 13, the travelling nut 153 carries a yoke member 159 having forks 160 and 161 which are slidably mounted on the shifter bar 152 in such manner that the end of the shifter yoke 151 is intermediate said forks. Thus, as the travelling nut 153 is moved along the shaft 155 one of the forks 160 or 161 is brought into engagement with the end of the shifter yoke 151 to automatically disengage the forward or reverse clutch drive of the clutch 155 depending upon the direction in which the shaft 149 is driven. To the free end of the shifter bar 152 is attached a hand lever 162 which is pivotally connected to a brace 163 carried by the projection 41 of the housing 1 for shifting the clutch 155 into operative engagement with either of bevel gears 148 and 149 to drive the shaft 149 in the desired direction.

As clearly shown in Figures 18 and 19 intermediate the central pair of the boring elements 2 and running parallel therewith is a pipe 108. The front end of such pipe is connected to a pipe 109 which is disposed transversely of the boring elements 2. Such transverse pipe is made up of a plurality of return bends connected together. Each of the return bends 110 intermediate the boring elements 2 is provided with a nozzle 111. The back end of the pipe 108 is adapted to be connected to a source of water supply as by a flexible hose 112 for the purpose to be subsequently described.

By reference to Figures 18 and 19 it will be apparent that the boring elements 2 comprise spiral bars 250 provided with auger bits 113 which are of a configuration such that they partially overlap each other. This enables the formation of contiguous communicating areas in the breast of coal or mineral which are in the form of circular holes interconnected to each other by means of passages whose upper and lower walls simulate a V-shaped rib, as clearly shown by the dotted lines in Figure 19. It is apparent that these passages permit the rods 95 carrying the expansive force inducing elements, together with water piping to enter into the breast of coal or mineral with the boring elements 2.

With reference to Figures 24 and 25 mounted in surrounding relation with the tube 37 is a sleeve 42 which has one end thereof extending into the transmission casing 18. Mounted upon the end of the sleeve 42 within the transmission casing 18 is the mechanism for moving the boring and expansive force inducing element assembly as a unit to a position such that the boring elements will be either in a horizontal or vertical plane. Such mechanism comprises a sleeve 114 fixedly mounted on the portion of the sleeve 42 which extends into the transmission casing 18. Carried by the sleeve 114 is a worm gear 115 which meshes with a worm 116 mounted on a shaft 117. The shaft 117 also carries a gear 118 Figure 27 which is in meshing engagement with a gear 119 mounted on a shaft 120. Mounted upon the shaft 120 is also a miter gear 121 which meshes with miter gears 122 and 123, said miter gears 122 and 123 being rotatably mounted on shaft 124. Mounted on shaft 124 intermediate the miter gears 122 and 123 and adapted to coact with either of said gears is a forward and reverse disk clutch 125. The shaft 124 also carries a gear 126 which meshes with a gear 127 rotatably mounted on shaft 128. Gear 127 meshes with and is driven by gear 19. The clutch 125 is operated by a shifter yoke 129 which is fixedly mounted on a shaft 130. The shaft 130 is slidably mounted in the transmission casing 18 and is operated by a lever 131 which is pivotally connected to a bracket 132.

As shown in Figures 13 and 24 the opposite end of the sleeve 42 extends into a projection 43 of a cap member 44 and is secured thereto, the said cap member being fixedly mounted upon the tube 37 adjacent the projection 41 of the housing 1. The cap member 44 houses a roller assembly comprising a plurality of rollers 133 whose outer peripheral surfaces correspond to the outer periphery of tube 37. Such rollers are rotatably mounted on pins 134. The roller assembly is locked to the tube 37 by means of a flexible pin device 135.

By reference to Figures 2, 3, and 24 it will be seen that surrounding the sleeve 42 are supporting sleeves 165 and 196 suitably spaced from each other, the sleeve 165 being secured to transmission casing 18 and the sleeve 196 being fixedly secured to the sleeve 42. Each of the sleeves 165 and 196 are provided with apertured wing portions 167 as shown in Figure 3. As the means for connecting such portions of both sleeves 165 and 196 to a wing bracket 168 is the same, only one of such connecting means is shown in detail in Figure 6. By reference to Figure 6, it will be seen that the wing portions 167 of sleeve 165 are secured to wing bracket 168 by means of pins 169, the wing bracket 168 being mounted on supporting standards or tubular supports 170 and carried thereby. One end of the supports 170 is supported in socket brackets 171 carried by the top of the movable portion 172 of the turntable 173. Mounted upon the top of the other end of the supports 170 is a wing bracket 174. As shown in Figure 2, the bracket 168 carries hand wheel screw pins 175 for locking them in the position to which they are moved on the supporting standards 170.

By referring to Figure 7, it will be apparent that the wing bracket 168 has threaded nuts 176 fixedly secured thereto which nuts are in threaded engagement with hollow tubes 177. The tubes 177 extend through the wing bracket 174 and are supported therein by means of collars 178 which rotate on thrust bearings 179. Extending into the end of each of the tubes 177 adjacent the threaded nut 176 is a projecting end of a shaft 180 of a speed reducer 181 which end is fixedly secured within the end of the tube 177. Each of the speed reducers 181 is connected to a reversible motor 182 by means of a flexible coupling 183. The speed reducers 181 and connecting motors 182 are fixedly mounted upon the movable portion 172 of the turntable 173, as clearly shown in Figure 7. Thus, by rotating the tubes 177 in either direction through the medium of the shafts 180, speed reducer 181, and motors 182, the tubular member carrying the boring element assembly is raised and lowered as a unit.

As shown in Figures 2 and 6, the outer periphery of the movable portion 172 of the turntable 173 is provided with gear teeth which are in meshing engagement with a pinion 184 carried by the end of a shaft 185 projecting from a speed reducer 186, said reducer being operatively connected to a reversible motor 187 by means of flexible coupling 188.

The stationary portion 189 of the turntable 173 carries trolleys 190 which ride along transversely disposed I beam rails 191, such rails being fixedly mounted upon the truck carriage 192. As shown in Figure 6, the ends of each of the I beam rails 191 are supported by tubes 193 which are anchored to the floor of the vein by means of claw shaped shoes 194. To the ends of each of the I beam rails 191 on the far side are connected upright tubes 195 which are anchored to the ceiling of the vein by means of claw shaped shoes 197 as shown in Figures 3 and 6.

The truck carriage 192 has trolley wheels 198 which are mounted for travel along longitudinally extending track rails 199 disposed upon the floor of the vein. The mechanism for driving the wheels 198 forwardly and backwardly along the track rails 199 is shown in Figures 8 and 9, and as the operative connections of the back pair of wheels 198 to the motor 200 is the same, the showing of only one of such connections is sufficient for a full understanding thereof. By reference to Figures 8 and 9, it will be seen that the truck wheel 198 is mounted upon a shaft 201, the said shaft carrying a gear 202 which meshes with a pinion 203. The pinion 203 is carried by the end of a shaft 204 projecting from a speed reducer 205 which is connected to a motor 200 by means of flexible coupling 206. By rotating the shaft 204, the truck carriage is caused to move forwardly longitudinally of the vein. The trolley wheels 198 are held in the position to which they have been moved by rail stops 207.

As shown in Figures 4 and 5 the housing 1 is provided with tongue shaped grooves for the reception of tongue members 208 of bracket 209, said bracket carrying an apron 210. The apron 210 comprises a plurality of parallel disposed hollow tubes 211 connected together by a transverse web 212 as shown in Figures 10 and 11. The front end of each of the tubes 211 is closed by means of pointed plugs 213 as shown in Figure 12. The bracket 209 carrying the apron 210 is attached to the bottom of the housing 1 when the boring elements are in the position shown in Figure 4.

As shown in Figures 10 and 15, the top portion of the housing 1 is provided with apertured lugs 214 which support the tubes 211 of the apron 210. The apron 210 is secured to the apertured lugs 214 of the housing 1 when the boring elements as a unit are in the dotted line position shown in Figure 2.

In operation of the apparatus of the present invention, the operator shifts the mounting of the boring and expansive force inducing device to a position such that the boring elements are in a horizontal plane. This is effected by moving the lever 131 in the proper direction so as to cause the respective portion of the clutch 125 to operatively engage with its complemental miter gear 122 or 123. The rotation of the miter gear 122 or 123 causes the rotation of the sleeve 42 carrying the housing 1 with its boring and expansive force inducing element assembly by means of the miter gear 121, shaft 120, gear 119, gear 118, shaft 117, worm 116, worm 115, and sleeve 114. As soon as the sleeve 42 has been rotated to a degree such that the boring elements are in a horizontal plane, the operator moves the lever 131 to its initial position and thereby disengages the clutch from its complemental miter gear 122 or 123. It is to be noted that the roller assembly 133 acts to hold the sleeve 42 in the position to which it has been moved by the rotation of the worm 115 carried by the sleeve 114.

With the boring and expansive force inducing element apparatus in the position such that the boring elements are in a horizontal plane, the operator lowers such apparatus to a point such that the boring elements in their adjusted position face a multiple of the breast at the juncture point of the breast and floor of the vein, the position shown in full lines in Figure 2. This is done by turning the hand wheel screw pins 175 in the proper direction so as to release the bracket 168 from locking engagement with the supporting standards 170, and then actuating the reversible motors 182 so as to rotate the tubes 177 in the proper direction to cause the threaded nuts 176 and bracket 168 to travel downwardly along the said tubes. As soon as the apparatus has been lowered to its desired position, the operator stops the actuation of the reversible motors 182, and then turns the hand wheel screw pins 175 in the opposite direction until the pins are in locking engagement with the supporting standards 170.

The operator next applies a pushing force to the right or left of the bracket 168 to shift the apparatus transversely to a position such that the boring elements are in a position to attack a multiple of the working breast extending from either one of the sides or intermediate the sides, preferably extending from either the right or left side of the vein. With the boring elements in such position, the operator starts the rotation of the motor shaft 27. The rotation of the shaft causes the rotation of each of the boring elements 2 through the pinions 6 carried by each of said elements. As shown in Figure 15, the pinions 6 are in mesh with each other, and such pinions are rotated in unison by means of a gear 7 which meshes with one of the pinions 6. The gear 7 is driven from the motor shaft 27 through the shaft 8, gear 9, shaft 10, gear 11, shaft 12, gear 13, hollow hexagonal shaft 14, hollow tube 15, nut 241, hexagonal shaft 16, gear 19, gear 20, shaft 21, gear 22, gear 23, shaft 24, gear 25, and pinion 26.

While the boring elements are rotating, the operator connects the hose 112 to the pipe 108, and causes the supply of water to flow through the hose 112 into pipe 108. At this point, the hand lever 79 is pushed inwardly, so as to cause the feeding of the rotating boring elements into the breast of coal or mineral. The pushing of the lever 79 inwardly moves the driven part 76 of the friction clutch into engagement with the loose part 67 of said clutch and thereby rotates shaft 45 through the medium of gears 66 and 65. The shaft 45 drives the sleeve 29 by means of gears 47, 49, and 31. By the rotation of the sleeve 29 the nut 36 is caused to move along the threaded portion 34 of the hollow tube 33, and thereby feed hollow tube 37 carrying the housing 1 with its combined boring and expansive force inducing elements apparatus forwardly into the breast of coal or mineral. The extent of travel forwardly of the nut 36 along the threaded portion 34 of the hollow tube 33 is controlled by means of the travelling yoke 90 which moves along tube 82 and threaded shaft 91 and contacts with and bears against the yoke connection 78 attached to the driven part 76 of the friction clutch at a certain point in its travel to disengage the driven part 76 from the loose part 67 of the clutch. As shown in Figures 17, 28, and 29, the travelling yoke 90 is caused to move forwardly along the threaded shaft 91 by means of sprocket 92, sprocket chain 94, and sprocket wheel 93.

The feeding of the boring elements into the face of the breast causes a plurality of spaced holes to be formed therein. Since the auger bits 113 of the boring elements 2 are of such configuration that they partially overlap each other, contiguous communicating areas are formed in the coal which are in the form of circular holes interconnected by passages whose opposite walls simulate V-shaped ribs as clearly shown by the dotted lines in Figure 19.

As the auger bits 113 of the boring elements 2 are working in the breast of coal or mineral to form contiguous communicating areas, water is applied to the portion of the breast in which such areas are being formed by means of nozzles 111. The water serves the purpose of allaying the dust induced by the action of the auger bits, and also acts as a cooling medium for the boring elements.

It is apparent that the contiguous communicating areas of the type shown in Figure 19 permit the rods 95 carrying the expansive force inducing elements to enter into the breast of coal or mineral with the boring elements 2. Thus, as the auger bits 113 of the boring elements are working in the breast to form contiguous communicating areas, the auger bit cuttings are picked up by the spiral bars 250 of the boring elements 2 and are fed by such bars backward toward the face of the breast.

When the boring elements have penetrated into the coal to the desired extent which is controlled by the disengagement of the driven part 76 from the loose part 67 of the clutch by means of the travelling yoke 90, the operator pushes the lever 84 inwardly so as to cause the feeding of the rotating boring elements away from the breast. The pushing of lever 84 inwardly moves the driven part 81 of the reverse clutch into engagement with the loose part 75 of the clutch, and thereby rotates shaft 45 reversely through gears 74, 72, and 71. The shaft 45 drives the sleeve 29 by means of the gears 47, 49, and 31 in the opposite direction to thereby feed the hollow tube 37 carrying the housing 1 backwardly and away from the breast. The extent of travel of the nut 36 reversely along the threaded portion 34 of the hollow tube 33 is controlled by means of the same travelling yoke 90 previously described but at a certain point in its reverse travel, the aforesaid yoke contacts with and bears against the yoke connection 83 attached to the driven part 81 of the reverse clutch to disengage the driven part 81 from the loose part 75 of the reverse clutch.

If desired, the speed at which the boring elements are fed toward and away from the breast of coal or mineral may be increased or decreased as desired. This may be done by shifting gear 49 into engagement with either of complemental pairs of gears 30 and 46, or 32 and 48. The shifting of gear 49 is effected by pulling outwardly on the knob 62 and then turning such knob in such direction that the forked bearing 52 will slide along the track 53 to the desired extent by means of pin 57 and arm 56. The gear 49 is then locked in its adjusted position by means of arm 59 and pin 60 as clearly shown in Figure 30.

When the boring elements have been retracted to their initial position, the operator pushes the bracket 168 to an extent sufficient to shift the apparatus to a point such that the boring elements are in a position to attack another multiple of the breast along the juncture point of the breast and floor of the vein, and repeats the feeding and withdrawing operations of the boring elements previously described. This is continued until an undercut has been formed which extends partially or completely, preferably completely, across the breast at this point. This undercut severs the coal from the bed rock of the floor.

Upon completion of the undercut at the base of the breast, the operator moves the lever 131 in the proper direction so as to cause the respective portion of the clutch 125 to operatively engage with its complemental meter gear 122 or 123 and rotate the sleeve 42 carrying the housing 1, and thereby move the boring elements to a position such that they are in a vertical plane adjacent the line of joinder between a side wall and the breast. With the boring elements thus positioned, the operator repeats the feeding and withdrawing operations of the boring elements previously described. The apparatus is then elevated to a position such that the boring elements are approximately just above the portion containing the bored contiguous communicating areas or holes but in the same vertical plane. This is effected by turning the hand wheel screw pins 175 in the proper direction so as to release the bracket 168 from locking engagement with the supporting standards 170, and then actuating the reversible motors 182 so as to rotate the tubes 177 in the proper direction to cause the threaded nuts 176 and bracket 168 to travel upwardly along said tubes. As soon as the apparatus has been raised to a position such as to attack another multiple portion of the breast along the juncture point of a side wall and the breast, the operator stops the actuation of the reversible motors 182, and then turns the hand wheel screw pins 175 in the opposite direction until the pins are in locking engagement with the supporting standards 170. The feeding and withdrawing operations of the boring elements previously described are again repeated. This is repeated successively until the coal or mineral in the breast along the side wall has been punctured from the floor to the roof of the vein, thereby forming a side cut. When this is completed, it is preferable to puncture the coal or mineral in the breast along the opposite side wall from the floor to the roof. This is done in the same manner as described for forming the side cut along the other side wall. The side cut fractures the cleavage of the coal or mineral in the breast along the side walls.

Upon completion of the formation of the side cut or cuts, the operator moves the lever 131 in the proper direction so as to cause the respective portion of the clutch 125 to operatively engage with its complemental miter gear 122 or 123 and rotate the sleeve 42 carrying the housing 1, and thereby return the boring elements to a position such that they are in a horizontal plane. Then, the hand wheel screw pins 175 are rotated in the proper direction so as to release the bracket 168 from locking engagement with the supporting standards 170, the reversible motors 182 actuated so as to rotate the tubes 177 in the proper direction to lower the apparatus to a point such that the boring elements will be at a point spaced above the undercut, and hand wheel screw pins 175 rotated in the opposite direction until the pins are in locking engagement with the standards 170, whereupon a pushing force is applied to the right or left of the bracket 168 to an extent sufficient to shift the apparatus to a point such that the boring elements are in a position to attack a multiple of the working breast extending from either one of the side cuts or intermediate the side cuts, preferably to a position extending from one of the side cuts. At this point, the operator attaches the bracket 209 carrying the apron 210 to the bottom of the housing 1 by sliding the tongue members 208 into the tongued grooves in said housing. The operator then repeats the feeding operation of the boring elements into the face of the breast, as previously described. As the boring elements are forming the contiguous communicating areas, the apron 210 is introduced progressively into the undercut. When the boring has progressed to a point where the boring elements have penetrated into the coal or mineral to the full extent of their length, the operator moves the lever 162 in the proper direction so as to cause the respective portion of the clutch 150 to operatively engage with its complemental bevel gear 148 or 149 and thereby actuate the expansive force inducing elements. The engagement of the respective portion of the clutch 150 with its complemental bevel gear 148 or 149 causes the rotation of each of the rods 95 through pinions 138 carried by each of said rods. As shown in Figure 16, each of the pinions 138 is in meshing engagement with a gear 139, and the gears 139 are driven by a gear 141 carried by a shaft 142. The shaft 142 is driven through the medium of bevel gear 143, bevel gear 144, shaft 145, bevel gear 146, and either of bevel gears 148 or 149 as shown in Figures 13 and 36. As the rods 95 are rotated, the pointed nose 99 of each of the nuts 98 is moved forwardly into contact with the inner surfaces of the jaw members 101 and 102 and presses against such members to such a degree as to cause the jaw members to extend outwardly and bear against the V-shaped walls of the interconnecting passages of the contiguous areas. The pressing of the jaw members against the V-shaped walls of the interconnecting passages induces expansive forces to be exerted upon the coal in the region of such areas which in themselves and unsupplemented by any auxiliary disruptive forces are of sufficient magnitude to break away and dislodge the coal or mineral in the region of such areas in sizable pieces with a minimum of fines and undersized particles. In other words, these expansive forces break away and dislodge the coal in the space bounded by the undercut and the portion of the plane in which the contiguous communicating areas are being formed. It is to be noted that the extent of rotation of the rods 95 is controlled by the nut 153 travelling along the threaded portion 154 of the shaft 155 until one of the forks 160 or 161 of the nut 153 is brought into engagement with the shifter yoke 151 whereupon the clutch 155 is disengaged and the rotation of the rods 95 is stopped. As soon as the rotation of the rods 95 is stopped, the operator moves the lever 162 in the proper direction so as to cause the respective portion of the clutch 150 to operatively engage with its complemental bevel gear 148 or 149 and thereby retract the expansive force inducing elements to their normal positions by the mechanism previously described. At this point, the operator repeats the withdrawing operation of the boring elements 2 and the apron 210, the apron serving as a support for the coal or mineral broken away from the face of the breast.

When the boring elements and apron have been retracted to their initial feeding position, the operator actuates the turntable 173 so that said elements and apron will move through an arcuate path to an extent such that they will be in a position above either of the portions 221 or 222 of a conveyor 220 shown in Figure 1, the said conveyor serving as a means for conveying the coal or mineral deposited thereon into mine cars not shown mounted on track rails 199. This is done by actuating the reversible motor 187 so as to rotate the shaft 185 and pinion 184 in the proper direction to cause the movable portion 172 of the turntable 173 to rotate to an extent such that the boring elements and apron are directly over either of portions 221 or 222 of the conveyor 220, whereupon the actuation of said motor 187 is stopped. At this point, the operator moves the lever 131 in the proper direction so as to cause the respective portion of the clutch 125 to operatively engage with its complemental miter gear 122 or 123 and rotate the sleeve 42 carrying the housing 1, and thereby move the boring elements and apron to a position such that they will be in a vertical plane. By the movement of the boring elements and apron from a horizontal plane position to the vertical plane position, the coal or mineral carried by the apron is discharged into the portion 221 or 222 of the conveyor 220. Upon the discharge of the coal or mineral from the apron, the operator moves the lever 131 in the opposite direction so as to cause the respective portion of the clutch 125 to operatively engage with its complemental miter gear 122 or 123 and rotate the sleeve 42 carrying the housing 1, and thereby move the boring elements and apron back to the horizontal plane position, whereupon the reversible motor 187 is actuated so as to rotate the shaft 185 and pinion 184 in the opposite direction to cause the movable portion 172 of the turntable 173 to rotate to an extent such that the boring elements and apron are returned to their initial feeding position.

Upon the return of the boring elements and apron to their initial feeding position, the operator pushes the bracket 168 to an extent sufficient to shift the apparatus transversely to a point such that the boring elements are in a position to attack another multiple of the breast adjacent the portion just broken away and removed. It is to be understood that the boring elements and apron are merely moved to a position in the same plane. The operator then repeats the feeding and withdrawing operations of the boring elements and apron, actuates the expansive force inducing elements at the completion of each feeding operation of the boring elements, and repeats the discharging operation of the coal or mineral from the apron intermediate each withdrawing and the succeeding feeding operations, all as previously described. This is continued until the coal or mineral has broken away and removed clear across this plane.

With the coal or mineral broken away and removed from the breast clear across the area bounded by the undercut at the juncture point of the floor and breast and the plate spaced above said undercut, the operator detaches the bracket 209 carrying the apron 210 from the bottom of the housing 1, and then inverts the housing 1 so that the boring elements are in the dotted line position shown in Figure 2. The inversion of such housing is effected by moving the lever 131 in the proper direction so as to cause the respective portion of the clutch 125 to operatively engage with its complemental gear 122 or 123 and rotate the sleeve 42 carrying the housing 1, and thereby move the boring elements to a position such that they are in a horizontal plane. With the boring elements in such position but with the housing 1 in inverted position, the operator attaches the apron 210 to the housing by inserting the respective ends of the tubes 211 in the apertured lugs 214. The boring elements and apron while in such position are next raised to a position such that the boring elements are in a horizontal plane spaced above the undercut portion but with the apron 210 so positioned that it is on a line just slightly below the edge of the protruding or undercut portion of the breast. The operator causes the boring elements and apron to be raised to such position by releasing the hand wheel screw pins 175 from locking engagement with the standards 170, and then causing the rotation of the tubes 177 in the proper direction and continuing such rotation until the housing 1 has been moved upwardly to the position where the boring elements are in a plane spaced above the undercut portion and the apron in position such that it will pass beneath the undercut portion. The hand wheel screw pins 175 are then moved into locking engagement with the standards 170, whereupon the operator causes the boring elements to operate in turn upon multiple portions of the breast along such plane and the undercut portion of the first plane has been broken away and removed. This is continued until all of the coal or mineral in the face of the breast has been mined.

After the entire face of the breast has been mined, the carriage 192 carrying the apparatus is moved forwardly along the track rails 199 to a position such that the apparatus can again attack the breast of coal in the manner previously described. This is accomplished by actuating the motor 200 for a sufficient time to drive the truck wheels 198, and thereby cause the carriage to be moved forwardly to the desired extent.

By the present invention it is possible to mine coal or similar mineral according to the well known entry, long-wall, short-wall, room, or like systems of mining, solely by mechanical means and without the employment of any explosives.

Having fully described the invention, what I claim as new and desire to secure by Letters Patent is:

1. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, and means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles.

2. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles, and means in cooperative relation with said boring elements for applying water to said elements and said areas to allay the dust induced by the action of the boring elements in the formation of such areas.

3. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means embodying expansible jaw members in association with said boring elements, and means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles.

4. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means embodying expansible jaw members in association with said boring elements, means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, and means in cooperative relation with said boring elements for applying water to said elements and said areas to allay the dust induced by the action of the boring elements in the formation of such areas.

5. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles, and means for moving said boring elements and said apron away from the breast to thereby effect removal of the coal or mineral thus broken away.

6. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles, means in cooperative relation with said boring elements for applying water to said elements and said areas to allay the dust induced by the action of the boring elements in the formation of such areas, and means for moving said boring elements and said apron away from the breast to thereby effect removal of the coal or mineral thus broken away.

7. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means embodying expansible jaw members in association with said boring elements, means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, and means for moving said boring elements and said apron away from the breast to thereby effect removal of the coal or mineral thus broken away.

8. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements for insertion into said undercut, means embodying expansible jaw members in association with said boring elements, means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, means in cooperative relation with said boring elements for applying water to said elements and said areas to allay the dust induced by the action of the boring elements in the formation of such areas, and means for moving said boring elements and said apron away from the breast to thereby effect removal of the coal or mineral thus broken away.

9. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements movable progressively into said undercut as the said areas are being formed, and means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles.

10. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements movable progressively into said undercut as the said areas are being formed, means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles, and spraying means in cooperative relation with said boring elements for applying water to said elements and said areas to allay the dust induced by the action of the boring elements in the formation of such areas.

11. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements movable progressively into said undercut as the said areas are being formed, means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles, spraying means in cooperative relation with said boring elements for applying water to said elements and said areas to allay the dust induced by the action of the boring elements in the formation of such areas, and means for moving said boring elements and said apron away from the breast to thereby effect removal of the coal or mineral thus broken away.

12. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements movable progressively into said undercut as the said areas are being formed, means embodying expansible jaw members in association with said boring elements, means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, and means for moving said boring elements and said apron away from the breast to thereby effect removal of the coal or mineral thus broken away.

13. In an apparatus for the mining of coal or similar mineral, a housing, a plurality of rotatable boring elements arranged in spaced and aligned relation mounted in said housing for boring contiguous communicating areas in the face of the breast of coal or mineral in a plane spaced from an undercut, an apron carried by said housing and in cooperative relation with said boring elements movable progressively into said undercut as the said areas are being formed, means embodying expansible jaw members in association with said boring elements, means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, means in cooperative relation with said boring elements for applying water to said elements and said areas to allay the dust induced by the action of the boring elements in the formation of such areas, and means for moving said boring elements and said apron away from the breast to thereby effect removal of the coal or mineral thus broken away.

14. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket mounted upon said supporting standards and carried thereby, means for connecting said sleeve to said wing bracket, a second wing bracket mounted upon the top of said supporting standards and carried thereby, a threaded means fixedly mounted in said first named wing bracket, a tube in threaded engagement with said threaded means and having an end thereof extending through said second named wing bracket and rotatably mounted therein, and means operatively connected to said tube for rotating said tube in either direction to thereby raise and lower said boring elements as a unit.

15. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a turntable, supporting standards carried by said turntable, a wing bracket mounted upon said supporting standards and carried thereby, means for connecting said sleeve to said wing bracket, a second wing bracket mounted upon the top of said supporting standards and carried thereby, a threaded means fixedly mounted in said first named wing bracket, a tube in threaded engagement with said threaded means and having an end thereof extending through said second named wing bracket and rotatably mounted therein, means operatively connected to said tube for rotating said tube in either direction to thereby raise and lower said boring elements as a unit, transversely disposed I beam rails, and trolleys carried by the bottom of said turntable and mounted for travel along said I beam rails to thereby shift said boring elements while in their adjusted position to any position intermediate the sides of the vein.

16. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a turntable, supporting standards carried by said turntable, a wing bracket mounted upon said supporting standards and carried thereby, means for connecting said sleeve to said wing bracket, a second wing bracket mounted upon the top of said supporting standards and carried thereby, a threaded means fixedly mounted in said first named wing bracket, a tube in threaded engagement with said threaded means and having an end thereof extending through said second named wing bracket and rotatably mounted therein, means operatively connected to said tube for rotating said tube in either direction to thereby raise and lower said boring elements as a unit, transversely disposed I beam rails, trolleys carried by the bottom of said turntable and mounted for travel along said I beam rails to thereby shift said boring elements while in their adjusted position to any position intermediate the sides of the vein, and means for rotating said turntable in either direction to thereby move said boring elements while in their adjusted position in an arcuate path toward and away from the face of the breast.

17. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, supporting standards, a wing bracket mounted upon said supporting standards and carried thereby, means for connecting said first and second named sleeves to said wing bracket, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, and means operatively connected to the end of said hollow tube adjacent said threaded nut for rotating said hollow tube in either direction to thereby raise and lower said boring elements as a unit.

18. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, supporting standards, a wing bracket mounted upon said supporting standards and carried thereby, means for connecting said first and second named sleeves to said wing bracket, means for locking and unlocking said first named wing bracket to said standards, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, and means operatively connected to the end of said hollow tube adjacent said threaded nut for rotating said hollow tube in either direction to thereby raise and lower said boring elements as a unit.

19. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, supporting standards, a wing bracket mounted upon said supporting standards and carried thereby, means for connecting said first and second named sleeves to said wing bracket, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, a shaft extending into the end of said hollow tube adjacent said threaded nut and connected thereto, and means operatively connected to said shaft for rotating said hollow tube in either direction to thereby raise and lower said boring elements as a unit.

20. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, supporting standards, a wing bracket mounted upon said supporting standards and carried thereby, means for connecting said first and second named sleeves to said wing bracket, means for locking and unlocking said first named wing bracket to said standards, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, a shaft extending into the end of said hollow tube adjacent said threaded nut and connected thereto, and means operatively connected to said shaft for rotating said hollow tube in either direction to thereby raise and lower said boring elements as a unit.

21. In an apparatus for the mining of coal or similar mineral, a housing, a plurality of rotatable boring elements arrangned in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, a turntable, supporting standards carried by said turntable, a wing bracket mounted upon said supporting standards and carried thereby, means for connecting said first and second named sleeves to said wing bracket, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, means operatively connected to the end of said hollow tube adjacent said threaded nut for rotating said hollow tube in either direction to thereby raise and lower said boring elements as a unit, transversely disposed I beam rails, and trolleys carried by the bottom portion of said turntable and mounted for travel along said I beam rails to thereby shift said boring elements while in their adjusted position to any position intermediate the sides of the vein.

22. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechansim interposed between said housing and said casing, a supporting sleeve surrounding said tubular member, a second supporting sleeve suitably spaced from said sleeve and surrounding said tubular member, a turntable, supporting standards carried by said turntable, a wing bracket mounted upon said supporting standards and carried thereby, means for connecting said first and second named sleeves to said wing bracket, means for locking and unlocking said first named wing bracket to said standards, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, means operatively connected to the end of said hollow tube adjacent said threaded nut for rotating said hollow tube in either direction to thereby raise and lower said boring elements as a unit, transversely disposed I beam rails, and trolleys carried by the bottom portion of said turntable and mounted for travel along said I beam rails to thereby shift said boring elements while in their adjusted position to any position intermediate the sides of the vein.

23. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, a turntable, supporting standards carried by said turntable, a wing bracket mounted upon said supporting standards and carried thereby, means for connecting said first and second named sleeves to said wing bracket, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, means operatively connected to the end of said hollow tube adjacent said threaded nut for rotating said hollow tube in either direction to thereby raise and lower said boring elements as a unit, transversely disposed I beam rails, trolleys carried by the bottom portion of said turntable and mounted for travel along said I beam rails to thereby shift said boring elements while in their adjusted position to any position intermediate the sides of the vein, and means for rotating said turntable in either direction to thereby move said boring elements while in their adjusted position in an arcuate path toward and away from the face of the breast.

24. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a turntable, supporting standards carried by said turntable, a wing bracket mounted upon said supporting standards and carried thereby, means for connecting said sleeve to said wing bracket, a second wing bracket mounted upon the top of said supporting standards and carried thereby, a threaded means fixedly mounted in said first named wing bracket, a tube in threaded engagement with said threaded means and having an end thereof extending through said second named wing bracket and rotatably mounted therein, means operatively connected to said tube for rotating said tube in either direction to thereby raise and lower said boring elements as a unit, a carriage, transversely disposed I beam rails mounted upon said carriage and carried thereby, trolleys carried by the bottom of said turntable and mounted for travel along said I beam rails to thereby shift said boring elements while in their adjusted position to any position intermediate the sides of the vein, longitudinally disposed tracks along the floor of the vein, and wheels carried by the bottom of said carriage and mounted for travel along said tracks to thereby move said boring elements as a unit longitudinally in the vein.

25. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a second supporting sleeve suitably spaced from said sleeve and surrounding said tubular member, a turntable, supporting standards carried by said turntable, a wing bracket mounted upon said supporting standards and carried thereby, means for connecting said first and second named sleeves to said wing bracket, a second wing bracket mounted upon the top of said supporting standards and carried thereby, a threaded nut fixedly mounted in said first named wing bracket, a hollow tube in threaded engagement with said nut and having an end thereof extending through said second named wing bracket and rotatably mounted therein, means operatively connected to the end of said hollow tube adjacent said threaded nut for rotating said hollow tube in either direction to thereby raise and lower said boring elements as a unit, a carriage, transversely disposed I beam rails mounted upon said carriage and carried thereby, trolleys carried by the bottom of said turntable and mounted for travel along said I beam rails to thereby shift said boring elements while in their adjusted position to any position intermediate the sides of the vein, longitudinally disposed tracks along the floor of the vein, and wheels carried by the bottom of said carriage and mounted for travel along said tracks to thereby move said boring elements as a unit longitudinally in the vein.

26. In an apparatus for the mining of coal or similar mineral, a housing, a plurality of rotatable boring elements arranged in spaced and aligned relation mounted in said housing and having an end extended through a wall thereof, means embodying expansible jaw members in association with said boring elements and an apron secured to said housing.

27. In an apparatus for the mining of coal or similar mineral, a housing provided with apertured lugs projecting from the top portion thereof, a plurality of rotatable boring elements arranged in spaced and aligned relation mounted in said housing and having an end extended through a wall thereof, means embodying expansible jaw members in association with said boring elements and an apron having means cooperating with said lugs for securing same to said housing.

28. In an apparatus for the mining of coal or similar mineral, a housing provided with grooves on the bottom thereof, a plurality of rotatable boring elements arranged in spaced and aligned relation mounted in said housing and having an end extended through a wall thereof, a bracket, an apron carried by said bracket, and means on said bracket cooperating with said grooves for securing same to said housing.

29. In an apparatus for the mining of coal or similar mineral, a housing provided with tongue shaped grooves on the bottom thereof, a plurality of rotatable boring elements arranged in spaced and aligned relation mounted in said housing and having an end extended through a wall thereof, a bracket, an apron carried by said bracket, and tongue members on said bracket cooperating with said grooves for securing same to said housing.

EDGAR M. CADWALLADER.